United States Patent Office 2,706,273
Patented Apr. 12, 1955

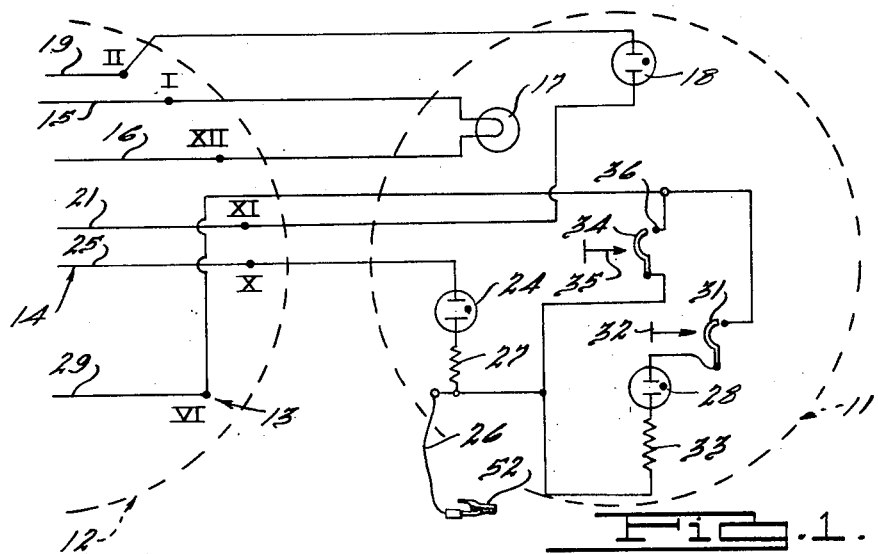
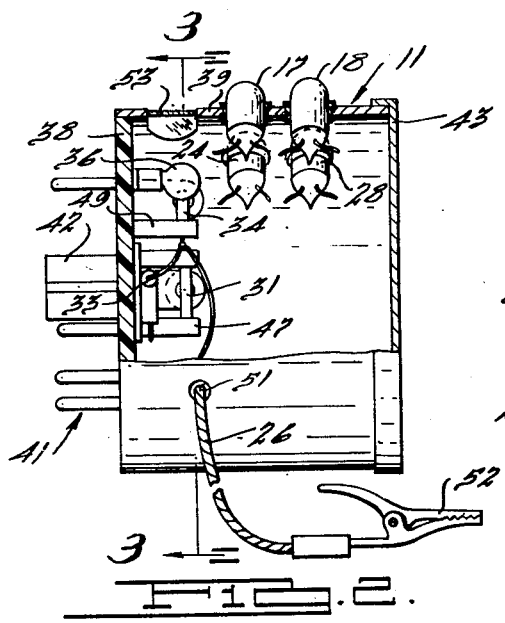
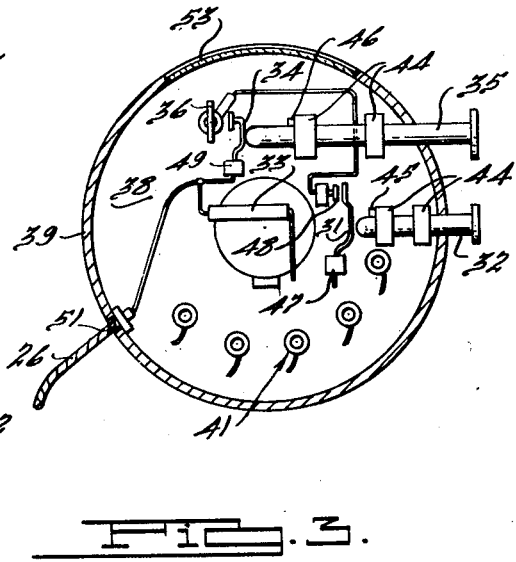

2,706,273

TELEVISION PICTURE TUBE VOLTAGE TESTER

Philip A. De Langis, Detroit, Mich.

Application February 13, 1952, Serial No. 271,407

5 Claims. (Cl. 324—72)

This invention relates to testing devices, and more particularly to devices for testing voltages applied to cathode ray tubes in television apparatus and the like.

In present day methods of servicing apparatus containing cathode ray tubes, such as television receivers, to determine sources of trouble, it has been found inconvenient and time-consuming to check the voltages applied to the various elements of the cathode ray tube. Checking such voltages in the early stages of the servicing operation is, of course, necessary in order to localize the faulty circuit elements and to determine whether it is the tube which is at fault or whether the trouble lies in some chassis component of the set or in the lead connections to the tube socket terminals. The conventional method of checking these tube voltages is by use of a voltmeter which must be clipped to the various terminals and shifted between such terminals to check the voltages. Not only is such a method slow and laborious, but it presents particular difficulties when checking for intermittence, since in correcting this phenomenon the leads must be jarred and pulled to determine whether a faulty connection is present. Since the meter connection is itself a temporary one, this jarring will often result in disconnecting the voltmeter leads and prolonging the testing time.

It is an object of the present invention to overcome the disadvantages of the previous methods of cathode ray tube voltage testing, and to provide a simple, accurate and efficient device which with a simple manipulation can simultaneously test most of the voltages which are applied to the tube elements.

It is another object to provide a device of the above character, which can be applied by merely removing the socket from the cathode ray tube and applying the testing device to the socket, whereupon the device will simultaneously indicate the presence and sufficiency of the tube voltages.

It is a further object to provide a testing device of this nature which is small, compact, and extremely inexpensive to fabricate. In this connection, it is an object to provide a device which does not make necessary the use of expensive meter elements but depends for its indicating properties on a plurality of indicator lamps of an inexpensive nature.

It is also an object to provide a testing device of the above character which is versatile and can be used in conjunction with all television sets now on the commercial market.

Other objects, features, and advantages of the present invention will become apparent from the subsequent description, taken in conjunction with the accompanying drawings.

In the drawings:

Figure 1 is a circuit diagram of the testing device shown in its position replacing the cathode ray tube and connected across the various pin jacks of the tube socket;

Figure 2 is a side elevational view partly in cross-section showing a preferred embodiment of the invention, portions of the wiring being omitted for clarity; and Figure 3 is a cross-sectional view taken along the line 3—3 of Figure 2 and showing the switch construction of the device.

This invention is shown schematically in Figure 1 as comprising a supporting base member generally indicated at 11 on which the operative portions of the device are mounted. The device is connected to a receptacle or socket 12 of the type which normally receives the base of a cathode ray tube (not shown). In the illustrated embodiment, the socket is shown as being of a conventional type used in commercial television receivers having electrostatic focus type picture tubes. The socket is provided with a plurality of pin jacks generally indicated at 13, shown in their conventional position and marked with Roman numerals. These pin jacks are connected by appropriate leads, generally indicated at 14, to the chassis (not shown) so as to apply the proper voltage to the various elements of the picture tube.

In testing the voltages applied to the picture tube it will of course be necessary to check the voltage across the heater, the grid bias or voltage difference between cathode and grid, the first anode voltage, and the focusing anode voltage. In particular, it is essential that the heater voltage be sufficiently high to properly raise the cathode temperature and that the grid bias be sufficiently low to prevent cut-off. Furthermore, the first anode voltage should be of such magnitude to properly attract the electron stream, and the focusing anode must also have the proper voltage. It should be observed at this point that the focusing anode voltage varies with different commercial receivers, and as will be described later, the device of this invention provides for testing focusing anode voltages of widely varying ranges. It should also be noted that no provision is made in the illustrated embodiment for testing the second anode voltage and that this connection is omitted from the pin jack diagram. The second anode voltage being in a high range is ordinarily tested by the ordinary sparkgap method.

Referring once more to the schematic diagram in Fig. 1, the testing device provides a plurality of lamps which are so arranged as to indicate by their illumination or their darkness the presence of proper voltages across the elements described above. In particular, for testing the voltage across heater leads 15 and 16, the invention provides an incandescent or filament lamp 17 which is connected across the pin jack terminals I and XII when the testing device is in operative position. This lamp is of such value that it will be illuminated when the voltages applied to terminals I and XII are sufficiently high, that is, in the ordinary commercial receiver, about 6 volts. If the voltage is below 6 volts, this lamp will not fully illuminate. The invention also provides a glow-discharge lamp 18 between the pin jack terminals II and XI which are connected to the grid lead 19 and the cathode lead 21 respectively. Lamp 18 is of such value that it will remain dark unless a voltage high enough to cause cut-off in the picture tube is present. In the ordinary set this cut-off voltage is approximately minus 45 volts, so that the lamp 18 remaining dark will indicate that the grid bias is below cut-off voltage, while glowing of lamp 18 will indicate too high a grid bias.

Another glow-discharge lamp 24 is connected on one side to the terminal X which connects with first anode lead 25. The other side of lamp 24 is connected to a ground lead 26 through a resistor 27, the first anode voltage being of course with respect to ground. The values of lamp 24 and resistor 27 are such that the lamp will not glow unless the first anode voltage is sufficiently high. Since in the ordinary set this voltage is on the order of 200 to 450 volts, the presence of resistor 27 is necessary.

Since the focusing anode voltage varies with different sets, the device provides a novel arrangement for testing either high magnitude or low magnitude focusing anode voltages with equal accuracy and safety. For testing focusing anode voltages in the nature of 300 to 500 volts, a glow discharge lamp 28 is provided and is connected on one side to the terminal VI supplied by the focusing anode lead 29. This connection is made through a switch 31 which is normally open but which may be closed by a manual plunger 32. When switch 31 is closed, lamp 28 will glow if sufficient voltage is being applied to the focusing anode lead. A resistor 33 is provided between lamp 28 and ground connection 26, for the same reason that resistor 27 is provided in the circuit of lamp 24.

For testing the relatively high focusing anode voltages, in the nature of 3000 volts, which are present in some sets, a spring contact 34 is connected to ground for by-passing lamp 28. This contact is normally open but when actuated by a plunger 35 will engage a fixed contact 36 which is connected to pin jack terminal VI. Upon gradual withdrawal of plunger 35, which is urged toward open position by the spring action of contact 34, an arc will be drawn between contacts 34 and 36 if sufficient voltage is present, in lead 29. The nature and length of this arc, when viewed by the trained serviceman, will indicate whether sufficient voltage is being applied to the focusing anode.

The preferred structural embodiment of the invention shown in Figures 2 and 3 is specifically adapted for quick and easy application to the television set in order to simultaneously test all the voltages above described. The device comprises the supporting base member generally indicated at 11 which includes a base portion 38 and a housing portion 39. The base portion is of flat circular shape and of insulative material, and has secured thereto a plurality of pins generally indicated 41 which are arranged identically with the pins ordinarily present on a picture tube base. The central portion of base 38 is provided with a guide extension 42 also similar to that present on a picture tube base. In fact, for production purposes the base 38 may be simply and cheaply fabricated by merely taking the bases of discarded picture tubes and removing the upper wall portions thereof.

The housing portion 39 is of cylindrical shape and may be closed at its outer end by a removable cover 43. Mounted in and extending through this housing body portion so as to be exposed on the exterior thereof are test lamps 17, 18, 24 and 28. It will be understood that while the lamps are shown in a particularly convenient grouping in the figure, they may be arranged in any suitable manner.

The housing portion 39 also supports the manual plungers 32 and 35, these plungers being further supported by guides 44 on base 38. Preferably the plungers are provided with pins 45 and 46 respectively to prevent their accidental removal from the assembly. Spring contact 31 is secured by an anchor 47 to base 38, plunger 32 being aligned with this switch so as to force it into engagement with a contact 48. Spring contact 34 is aligned with plunger 35 and is secured to the base by anchor 49. Contact 36, which is connected to the proper pin 41, is engageable by spring contact 34. Upon gradual release of pressure from plunger 35, the contacts 34 and 36 will separate, drawing an arc if sufficient voltage is present. The resistors 26 and 33 are also enclosed within the unit 37 and while resistor 27 is not shown in Figures 2 or 3, resistor 33 is shown as being disposed adjacent base 38. The ground lead 26 extends through aperture 51 in housing 39 and is provided with a ground clip 52. As stated previously, part of the wiring between the pins 41 and the various lamps, switches and resistors is omitted from Figures 2 and 3, but it will be obvious that this wiring will be so arranged as to be entirely enclosed within housing 39.

A window 53 is provided in housing 39 in order to view the arc created by contacts 34 and 36. This window is preferably of an arcuate nature and in the illustrated embodiment is adjacent the lamps so that the various portions of the device may be simultaneously observed.

The operation of the device will be obvious from the foregoing description. The socket 12 is removed from the picture tube of the television receiver and the testing device is inserted in place of the tube. This will automatically apply to the testing device the voltages which are ordinarily applied to the picture tube elements, so that the various lamps, with the exception of lamp 28, are immediately operative when ground lead clip 52 is connected to ground. In particular, lamp 17 will be illuminated if the voltage across the heater terminals I and XII is sufficiently high, lamp 18 will remain out if the grid bias between terminals II and XI is sufficiently low, and lamp 24 will glow if the first anode voltage at terminal X is sufficient. If the focusing anode voltage is in the low range, depression of the plunger 32 will ignite lamp 28 if this voltage, as applied to terminal VI, is proper. If the focusing anode voltage is in the high range, depression and gradual withdrawal of plunger 35 will draw an arc between contacts 34 and 36, visible through window 53, and the character of this arc will indicate the sufficiency of the voltage. If any or all of the above described voltages are not proper, the corresponding lamp or lamps will not illuminate, or in the case of the grid bias voltage lamp 21, will illuminate to indicate improper voltage. Thus, in a matter of a few seconds, the voltages applied to the picture tube may be tested with sufficient accuracy to indicate whether the trouble lies in the picture tube or in the chassis components.

If it is necessary to test for intermittent operation, the various leads 14 to the pin jacks 13 may be jarred and pulled without danger of breaking the connection to the testing device. This is because the testing device is hooked into the circuit with the same permanency that the picture tube itself has when it is connected to the socket.

It will be observed that none of the portions of the testing circuit interfere with any other portions, because of the fact that a separate indication is provided for each voltage to be tested. Thus, for example, the presence or absence of sufficient first anode voltage will in no way effect the proper testing of either the focusing anode or any other of the tested voltages. Likewise, the presence or absence of sufficient heater voltage will not effect proper testing of the grid bias or the other voltages.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a device for testing the voltages available to a cathode ray tube, a supporting member having a base adapted to be applied to the tube socket, said base having pins corresponding to the pins which are operative in the tube to connect the elements thereof to their power sources, a filament lamp supported by said unit and connected between those pins adapted to enter the heater pin jacks, said filament lamp being of such value as to glow only when sufficient filament heater voltage is present, a glow-discharge lamp supported by said unit and connected between those pins adapted to enter the cathode and grid pin jacks, said glow-discharge lamp having such value as to glow only when the grid bias exceeds cut-off voltage, a second glow-discharge lamp supported by said unit and connected between the first anode pin and ground, said second glow-discharge lamp being of such value as to glow only when sufficient first anode voltage is present, a third glow-discharge lamp supported by said unit and connected between the focusing anode pin and ground, said third glow-discharge lamp being of such value as to glow only when sufficient focusing anode voltage is present, a normally open switch interposed between said third glow-discharge lamp and the focusing anode pin, and means for manually holding said switch closed.

2. In a device for testing the voltages available to a cathode ray tube, a supporting member having a base adapted to be applied to the tube socket, said base having pins corresponding to the pins which are operative in the tube to connect the elements thereof to their power sources, a filament lamp supported by said unit and connected between those pins adapted to enter the heater pin jacks, said filament lamp being of such value as to glow only when sufficient filament heater voltage is present, a glow-discharge lamp supported by asid unit and connected between those pins adapted to enter the cathode and grid pin jacks, said glow-discharge lamp having such value as to glow only when the grid bias exceeds cut-off voltage, a second glow-discharge lamp supported by said unit and connected between the first anode pin and ground, said second glow-discharge lamp being of such value as to glow only when sufficient first anode voltage is present, a third glow-discharge lamp supported by said unit and connected between the focusing anode pin and ground, said third glow-discharge lamp being of such value as to glow only when sufficient focusing anode voltage is present, a normally open switch interposed between said third glow-discharge lamp and the focusing anode pin, means for manually holding said switch closed, a second normally open switch connecting said focusing anode pin directly to ground, and means for manually moving said second switch to closed position, gradual release of said last mentioned manual means causing selective spacing of said second switch contacts for arcing purposes.

3. In a device for testing the voltages applied to the socket of a cathode ray tube, a base having pins arranged identically with those of the tube, a cylindrical housing supported by said base, a filament lamp supported by said housing in exposed position, said filament lamp being connected between the heater pins and being of such value as to glow only when sufficient heater voltage is present, a first glow-discharge lamp supported by said housing in exposed position, said last-mentioned lamp being connected between the grid and cathode pins and being of such value as to glow only when the grid bias is greater than cut-off voltage, a second glow-discharge lamp supported by said housing in exposed position, said last-mentioned lamp having one side connected to the first anode pin, a ground lead extending from said housing and adapted to be connected to ground, the other side of said last-mentioned lamp being connected to said ground lead, said last-mentioned lamp being of such value as to glow only when sufficient first anode voltage is present, a resistor within said housing and in series with said second glow-discharge lamp, a third glow-discharge lamp having one side connected to the focusing anode pin and the other side connected to said ground lead, a resistor in series with said last-mentioned lamp, a normally open switch supported by said base and in series with last-mentioned lamp, and a manual plunger extending through said housing for closing said switch.

4. In a device for testing the voltages applied to the socket of a cathode ray tube, a base having pins arranged identically with those of the tube, a cylindrical housing supported by said base, a filament lamp supported by said housing in exposed position, said filament lamp being connected between the heater pins and being of such value as to glow only when sufficient heater voltage is present, a first glow-discharge lamp supported by said housing in exposed position, said last-mentioned lamp being connected between the grid and cathode pins and being of such value as to glow only when the grid bias is greater than cut-off voltage, a second glow-discharge lamp supported by said housing in exposed position, said last-mentioned lamp having one side connected to the first anode pin, a ground lead extending from said housing and adapted to be connected to ground, the other side of said last-mentioned lamp being connected to said ground lead, said last-mentioned lamp being of such value as to glow only when sufficient first anode voltage is present, a resistor within said housing and in series with said second glow-discharge lamp, a normally open switch connected between the focusing anode pin and said ground lead, a manual plunger extending through said housing for closing said switch, and a window in said housing for viewing the arc created between the contacts of said switch when it is opened.

5. In a device for testing the voltages applied to the socket of a cathode ray tube, a base having pins arranged identically with those of the tube, a cylindrical housing supported by said base, a filament lamp supported by said housing in exposed position, said filament lamp being connected between the heater pins and being of such value as to glow only when sufficient heater voltage is present, a first glow-discharge lamp supported by said housing in exposed position, said last-mentioned lamp being connected between the grid and cathode pins and being of such value as to glow only when the grid bias is greater than cut-off voltage, a second glow-discharge lamp supported by said housing in exposed position, said last-mentioned lamp having one side connected to the first anode pin, a ground lead extending from said housing and adapted to be connected to ground, the other side of said last-mentioned lamp being connected to said ground lead, said last-mentioned lamp being of such value as to glow only when sufficient first anode voltage is present, a resistor within said housing and in series with said second glow-discharge lamp, a third glow-discharge lamp having one side connected to the focusing anode pin and the other side connected to said ground lead, a resistor in series with said last-mentioned lamp, a normally open switch supported by said base and in series with last mentioned lamp, a manual plunger extending through said housing for closing said switch, a second normally open switch bypassing said third glow-discharge lamp between the focusing anode pin and ground, a manual plunger extending through said housing for closing said last-mentioned switch, and a window in said housing for viewing the arc created between the contacts of said last-mentioned switch when it is opened.

References Cited in the file of this patent

UNITED STATES PATENTS

| Number | Name | Date |
|---|---|---|
| 1,625,111 | Weinaug | Apr. 19, 1927 |
| 1,786,555 | Wilson | Dec. 30, 1930 |
| 2,094,645 | Foulke | Oct. 5, 1937 |
| 2,366,991 | Wich | Jan. 9, 1945 |
| 2,499,116 | Simons | Feb. 28, 1950 |
| 2,547,248 | Bartholomew | Apr. 3, 1951 |
| 2,578,288 | Cook | Dec. 11, 1951 |
| 2,609,409 | Radeke | Sept. 2, 1952 |